United States Patent
Weissenburg

[11] 3,831,668
[45] Aug. 27, 1974

[54] TOWER TYPE HEAT EXCHANGERS FOR HEAT INTERCHANGE BETWEEN GASES HEATED TO DIFFERENT TEMPERATURES

[76] Inventor: Per Torsten Weissenburg, Vireberfsvagen 13, Solna, Sweden 17140

[22] Filed: May 17, 1972

[21] Appl. No.: 188,569

[52] U.S. Cl............................... 165/107, 432/215
[51] Int. Cl............................................. F28d 17/00
[58] Field of Search............ 165/107; 432/215, 216, 432/217; 23/277 R, 288 G, 284; 34/57 A

[56] References Cited
UNITED STATES PATENTS

| | | | |
|---|---|---|---|
| 1,178,667 | 4/1916 | Niewerth | 165/107 |
| 2,551,905 | 4/1946 | Robinson | 432/215 |
| 2,678,812 | 10/1951 | Richardson | 165/107 |
| 2,739,994 | 4/1952 | Bills | 432/215 |
| 3,630,501 | 12/1971 | Shabaker | 432/215 |

FOREIGN PATENTS OR APPLICATIONS

| 1,083,624 | 1/1955 | France | 165/107 |
|---|---|---|---|

OTHER PUBLICATIONS

"The Pebble Heater" by C. L. Norton, The Babcock & Wilcox Company, Journal of the American Ceramic Society, p. 187–193, 29[7] 1946 pg. 188 relied upon.

*Primary Examiner*—Samuel Scott
*Assistant Examiner*—Allan Russell Burke
*Attorney, Agent, or Firm*—Fleit, Gripple & Jacobson

[57] ABSTRACT

A pebble heat exchanger which uses the waste heat of the exhaust stack to raise the temperature of the intake air for the furnace, thereby acting as an economizer. This heat interchange between two gases at different temperatures, is effected through the medium of small heat-exchange bodies which are arranged to fall freely under gravity through a generally vertically tower with upper, intermediate and lower chamber. The intermediate chamber can be maintained at a pressure above or below atmospheric pressure for purposes of keeping the gases separate so as to prevent contamination therebetween.

10 Claims, 4 Drawing Figures

TOWER TYPE HEAT EXCHANGERS FOR HEAT INTERCHANGE BETWEEN GASES HEATED TO DIFFERENT TEMPERATURES

The present invention relates to a tower type heat exchanger for heat interchange between two gases heated to different temperatures, in which heat exchanger the transfer of heat between the gases is effected through the medium of small heat-exchange bodies which are arranged to fall freely under gravity through a generally vertical tower having an upper chamber, means for conveying the heat exchanger bodies to the upper chamber, means for supplying one of the gases preferably radially to the upper chamber, a lower chamber, and means for supplying the other gas preferably radially to the lower chamber.

Hitherto known heat exchangers which operate with regenerative media as a heat conductor are encumbered with a number of disadvantages which considerably limit the utility of such heat exchangers. One of these disadvantages is the difficulty experienced in holding the gases separate to prevent contamination. Moreover, it is difficult in such heat exchangers to maintain different pressures in the heat donating and the heat receiving zones within the apparatus without disturbing the operation thereof, and to maintain uniform vertical movement of the regenerative medium through the zones, this latter feature being a prerequisite of efficient operation.

The main object of the present invention is to eliminate these and other disadvantages and to provide a heat exchanger which is highly efficient and reliable and which can be produced at relatively low cost.

This object is achieved by means of the claimed heat exchanger, which is mainly characterized in that arranged between the upper and lower chamber is an intermediate chamber which is provided with a plurality of preferably tubular means forming elongate passages the upper ends of which issue beneath the bottom surface of the upper chamber, which is provided with openings corresponding to said passages, and the lower ends of which extend down into the lower chamber, the openings in the bottom surface of the upper chamber being so dimensioned that the small bodies form cone-shaped heaps at the point of entry into and the point of exit out of the passages, and that means are provided for subjecting the intermediate chamber to a pressure above or below atmosphere.

The invention will now be described with reference to an embodiment thereof illustrated in the accompanying drawing, in which FIG. 1 is a vertical section through an apparatus according to the invention.

Figure 1:
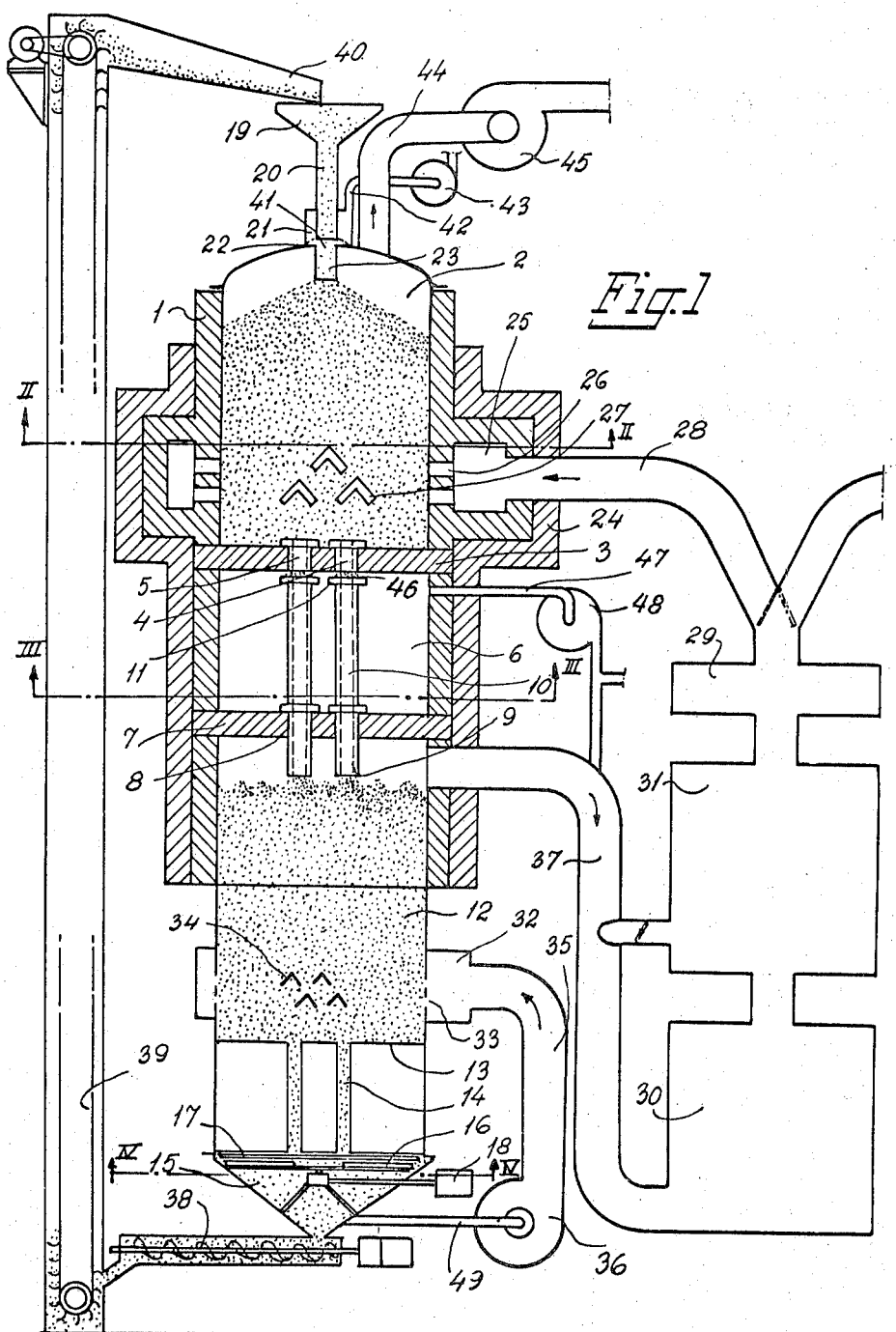

The illustrated heat exchanger comprises a tower 1 constructed of refractory material and having an upper chamber 2 which is provided with a bottom surface 3 in which is disposed a number of openings 4 serving to retain flanged hollow bushings 5. Arranged beneath the chamber 2 is a space 6 having a bottom surface 7 in which is disposed a number of openings each of which is arranged to receive the lower portion 9 of a flanged tube 10, the upper end of which tube is suitably formed with flange portions 11 and terminates short of the under surface of the bottom surface 3. Beneath the space 6 there is arranged a lower chamber 12 having a bottom surface 13 which communicates via a number of passages 14 and a dispensing means 16 with a collecting and distributing chamber 15, the dispensing means being in the form of a stationary member which includes Y-shaped support arms for a number of plates 16 capable of being adjusted vertically by means of a worm drive arrangement, distance members and the like. The plates 16 are positioned concentrically with the mouths of the passages 14. Located immediately above the plates 16 is a rotating doctor device having a hub from which extends a number of pusher arms 17 and driven by a variable speed motor 18.

Connected to the upper chamber is a charging means comprising a feed hopper 19 having a tubular portion 20 which extends down through the upper portion of a container 21 and opens out immediately above the container bottom 22, the container bottom 22 having depending therefrom a tubular extension 23.

Figure 2:
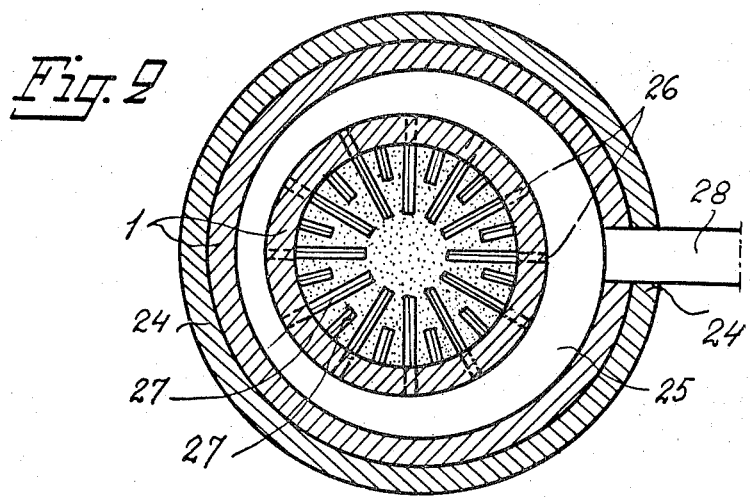
FIG. 2 is a section through the line II — II in FIG. 1.
Figure 3:
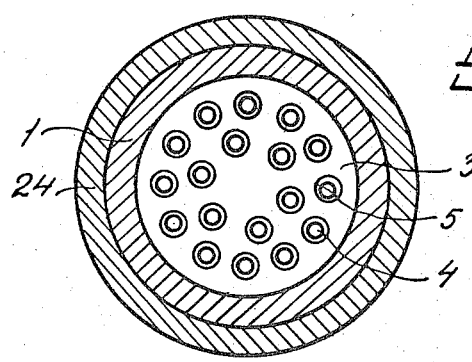
FIG. 3 is a section through the line III — III in FIG. 1.
Figure 4:
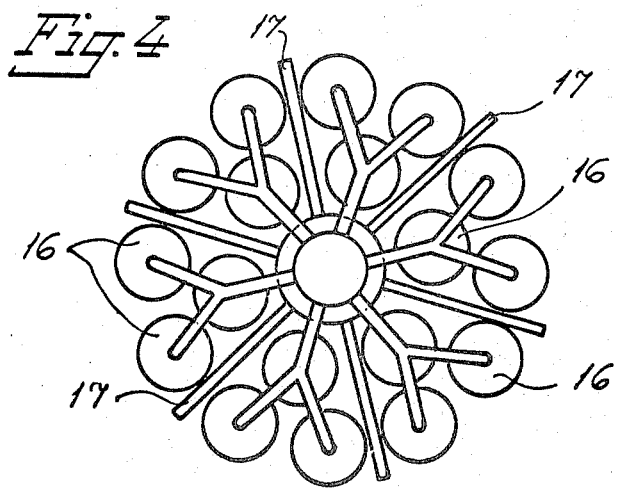
FIG. 4 is a section through the line IV — IV in FIG. 1.

As will be seen from the drawing, the upper chamber 2 is encircled by a casing 24 in which is disposed an annular passage 25 which communicates with the interior of the chamber 2 through a series of openings 26. The openings 26 are located immediately beneath a number of channel forming elements 27 which, when seen in cross section, have the shape of an inverted V and which extend radially inwardly from the inner wall of the upper chamber 2 (FIG. 2) As will be evident from the following, the inverted V-shaped channel forming elements 27 serve double purpose, insomuch as many form passages for the respective gases and retarding means and distribution means for the heat exchange bodies. Connected to the annular passage 25 is a conduit 28, which in the exemplary embodiment extends from a cyclone 29. The cyclone 29 serves to cleanse flue gases which are passed from a furnace 30 to the heat exchanger, e.g. via an after-burner 31, to recover a part of their heat content.

Similar to the above arrangement, there is connected to the lower chamber 12 an annular chamber 32 which communicates with the chamber 12 through a number of openings 33 and which is connected to the pressure side of a fan 36 by means of a fresh-air line 35, through which fresh air is supplied to the chamber 12. Arranged in the chamber 12 is also a number of inverted V-shaped channel forming elements 34 which serve to distribute the incoming air uniformly through the chamber. Subsequent to being heated in a manner to be explained hereinafter, the air can be passed either to the furnace 30 or to the after-burner 31 through a line 37.

To obtain continuous circulation of the heat exchange bodies through the system, the distributing chamber 15 is arranged to co-operate with a conveyor system 38, which in the exemplary embodiment has the form of a screw conveyor and which in turn co-operats with an elevator means 39 arranged to lift the heat exchange bodies to a chute 40 passing to the feed hopper 19.

An important feature of the present invention resides in the fact that the pressure is equalized between the different zones of the heat exchanger and that the tendency of the small heat exchange bodies to form cone-shaped heaps hereinafter called fallcones when falling through narrow passages onto surfaces located close to the exits of the passages, is utilized to equalize said pressures. The first of these arrangements, which is intended to prevent cold air from being drawn into the heat exchanger, is arranged in connection with the container 21, in which a first fallcone 41 is formed. The upper portion of the container 21 located above the fallcone 41 communicates with the suction side of a fan 43 through a line 42, while the upper potion of the upper chamber 2 communicates with the suction side of a fan 45, by means of which it is possible to adjust the pressure in the upper portion of the chamber. By causing the pressure in the container 21 slightly to exceed the pressure in the upper chamber 2, it is possible to prevent cold air from being drawn into the chamber. Intermixing of the heat donating and the heat receiving gases is prevented by means of the tubes 10, while the pressure in the space 6 is adjusted to the pressure in the upper and the lower chambers, thereby providing for the desired effect, by means of a fan 48 whose suction side is connected to the space 6 via a line 47. By a changing throttling means in the various lines, the system can be selectively regulated substantially as illustrated in the drawing. Any dust which accompanies the small heat exchange bodies can be separated, for example, in a specially arranged dust separator. The heat exchanger operates as follows:

Subsequent to having passed the after-burner 31 and cleansed in the cyclone 29, the flue gases from the furnace 30 are passes through the passage 28 to the annular distributing passage 25, from where they penetrate into the upper chamber 2 through the openings 26 and the inverted V-shaped channel means 27. The gases flow upwardly through the chamber 2 while giving off heat to the regenerative medium, which in the present case is in the form of small particles of heat resistant material such as stone, metal or the like, suitably having a diameter of 5 – 10 mm, whereafter the gas is passed by the fan 45 to the surroundings or to an apparatus for recovering residual heat. The small heat exchange bodies are continuously fed by the elevator 39 to the hopper 19, from where they fall smoothly down through the tube 20 and enter the chamber 2, from where they continue to sink downwardly. The fan 43 creates a sub-pressure in the container 21 which balances the sub-pressure in the chamber 2, the subpressure in said chamber 2 being created by the fan 45. During their passage through the appratus, the small heat exchange bodies are distributed between the members 27 and form a large number of streams, each of which is through passed by the rising gas stream supplied via said members, and thereafter run through the opening in the bushing 5 down in the tubes 10, the upper mouths of which are provided with flanges and are located at such a distance from the bushings that the small heat exchange bodies form fall-cones on the flange surfaces. Since the fall-cones are permeable to the gas and are located in a chamber which is closed in other respects, an adjusted pressure equilization effect is provided by the fan 48 in a manner such that the flue gases are unable to pass downwardly or air upwardly through the bushing 5. The small heat exchange bodies, which have now obtained their maximum heat content, fall through the tubes 10 down into the space 6, in which gas, in the present instance air, flown through the small heat exchange bodies and absorbs the heat given off thereby during its passage up through the apparatus. The small heat exchange bodies, which upon entry into the chamber have a high heat content, deliver the major portion of their heat to the upwardly flowing air and, subsequent to passing between the air distributing members 34, leave the chamber through the passage 14, of which only two have been shown, where they are momentarily arrested against the plates 16, the plates being located at such a distance from the lower exiting mouths of the passages that fall-cones are formed. The air to be pre-heated is supplied to the distributing passage 32 by the fan 36, and flows from the passage 32 through holes 33 and the distributing members 34 into the mass of small heat exchange bodies, and rises substantially vertically to leave the chamber through the outlet 37. The small heat exchange bodies arrested by the plates 16 are successively swept from the plates by the wiper means 17, the speed of which can be adjusted and which thus comprises a portion of a dispensing means. In this manner the small heat exchange bodies are fed down to the collecting portion 15, from the lower end of which they are conveyed by the conveyor 38 to the elevator 39, which carries the bodies to the hopper 19, whereafter the cycle continues in the manner described above. A minor portion of the air which the fan 36 has passed to the small heat exchange bodies at a relatively high pressure attempts to pass through the passages 14 down into the collecting portion 15, but is re-ducted to the suction side of the fan 36 through a passage 49 and returned to the system. The regulation of the pressure differences and other working parameters can either be effected manually or by means of suitable automatic means.

I claim:

1. A tower type heat exchanger for the exchange of heat between gases of different temperature, in which heat exchanger a heat exchange medium in the form of relatively small heat exchange bodies is arranged to fall by gravity through said heat exchanger, said tower type heat exchanger comprising: a generally vertical tower having an upper chamber; heat exchange medium exit openings arranged in the bottom of said upper chamber; means for feeding said heat exchange medium to said upper chamber; first entry means co-acting with said upper chamber for introducing one of said gases thereinto; a lower chamber beneath said upper chamber; second entry means for introducing another of said gases thereinto; an intermediate chamber located between the upper and the lower chambers; flanged elongate tubular members extending vertically through said intermediate chamber and into said lower chamber, and being in general registry with the heat exchange medium exit openings of said upper chamber but spaced therefrom; gas outlet means formed between said heat exchange medium exit openings of said upper chamber and the flanges of said elongate tubular members; further tubular members extending vertically from the bottom of said lower chamber; receiving surfaces arranged beneath the outlet ends of said further tubular members but spaced therefrom for receiving said heat exchange medium; and means co-acting with said intermediate chamber for maintaining a subpressure or a pressure above atmospheric therein.

2. A heat exchanger according to claim 1 characterized in that the space located beneath the lower chamber communicates with the suction side of the fan arranged to transport the gas which is to be heated.

3. A heat exchanger according to claim 1 characterized in that the small heat exchange bodies are supplied to the upper chamber through a relatively narrow passage, which in the bottom of the end of a tube extend down into a container (21) located above said chamber and connected to the suction side of a fan, and in that said container extends down into the upper chamber via the end of a tube, said upper portion of the upper chamber being connected to the suction side of a second fan.

4. A heat exchanger according to claim 1, characterized in that the tower is provided around its periphery with a number of openings through which respective gases can be supplied to the tower, and that extending from the inside of the tower is a number of radially extending members arranged immediately above said openings in a manner such as to form downwardly open supply passages for the gas in question and simultaneously retarding and distributing means for the heat-exchange bodies.

5. A heat exchanger according to claim 4 characterized in that the said radially extending members are in the shape of an inverted V-when seen in cross section.

6. A heat exchanger according to claim 1 characterized in that the lower chamber has a relatively thick bottom portion provided with a number of elongate passages extending vertically through said bottom surface: that arranged beneath each of said passages and at a vertical, preferably adjustable distance from the exiting mouth of respective passages is a collecting surface whose area is so selected in relation to the dimension of the passage and said vertical distance that said collecting surface is capable of receiving all the small heat exchange bodies arriving through the passage in question, and that arranged between the mouths of the passages and the collecting surfaces are driven doctor means adapted to feed the small heat exchange bodies collected on the collecting surfaces into a lower chamber, from which chamber they are removed.

7. A heat exchanger according to claim 6, characterized in that the doctor means comprises a number of arms extending from a rotatable hub.

8. A heat exchanger according to claim 6 characterized in that the collecting surfaces comprise vertically adjustable plates attached to support arms extending from a hub member.

9. A heat exchanger according to claim 6, wherein said heat exchange bodies are removed from said lower chamber by gravity.

10. A heat exchanger according to claim 6, wherein said heat exchange bodies are removed from said lower chamber by a conveyor means.

* * * * *